Jan. 9, 1962     H. F. DALGLISH     3,015,954
AVERAGE TEMPERATURE INDICATOR
Filed Nov. 25, 1955     2 Sheets-Sheet 1
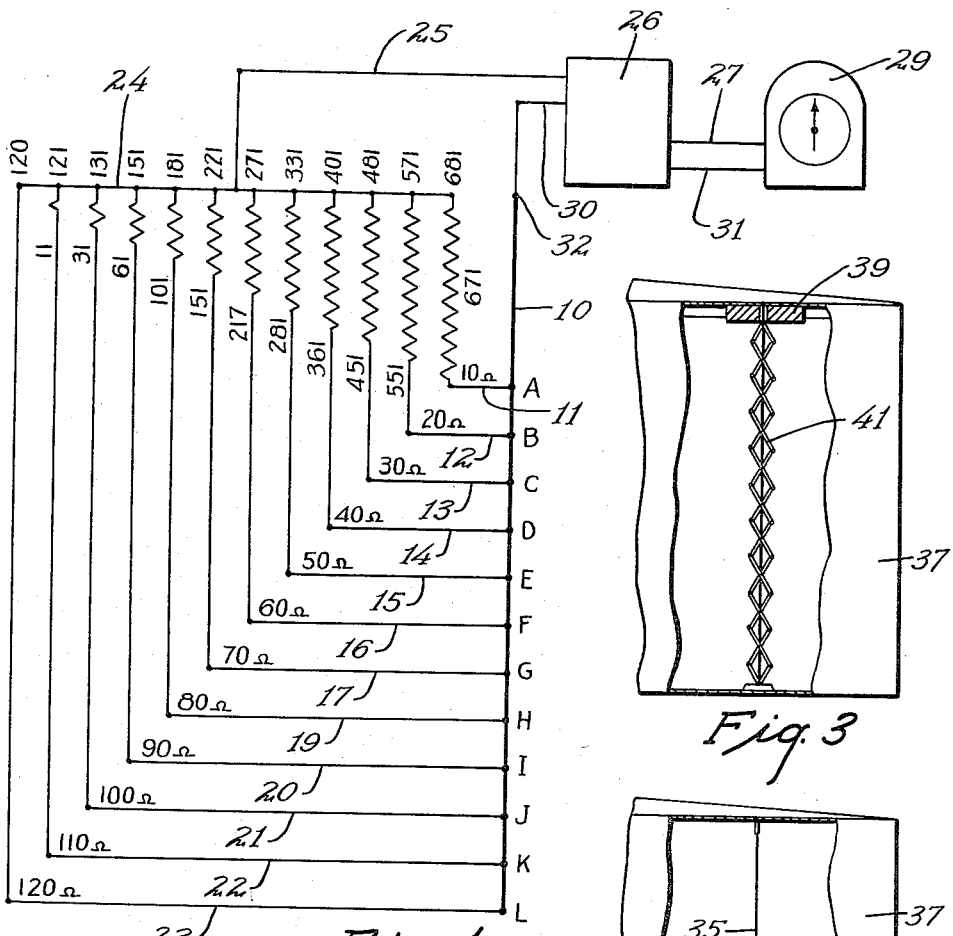
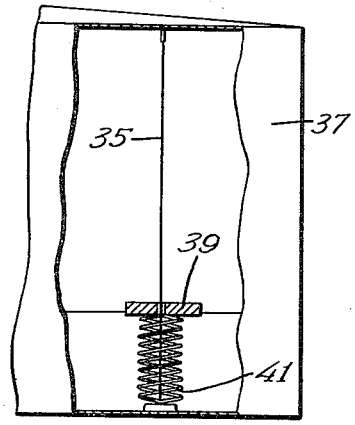
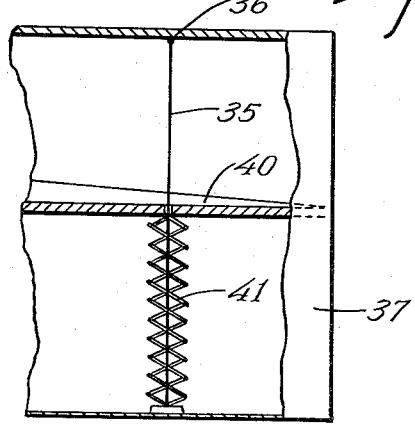
INVENTOR
Herbert F. Dalglish
BY Robert M. Dunning
ATTORNEY Jan. 9, 1962     H. F. DALGLISH     3,015,954
AVERAGE TEMPERATURE INDICATOR Filed Nov. 25, 1955     2 Sheets-Sheet 2

INVENTOR
Herbert F. Dalglish
BY Robert M. Dunning
ATTORNEY

United States Patent Office 3,015,954
Patented Jan. 9, 1962

3,015,954
AVERAGE TEMPERATURE INDICATOR
Herbert F. Dalglish, St. Paul, Minn., assignor to
Mark W. Gehan, St. Paul, Minn.
Filed Nov. 25, 1955, Ser. No. 549,070
5 Claims. (Cl. 73—341)

This invention relates to an improvement in average temperature indicator and deals particularly with an apparatus providing a single average reading from numerous points of different temperatures.

There are many uses for an apparatus capable of providing an indication of average temperature. For example, in tanks which contain oil, gasoline and the like, it is necessary to determine the average temperature of the liquid throughout the tank in order to provide a true calculation of the contents of the tank. In view of the fact that certain liquids expand and contract to a considerable degree, an indication of the level of liquid in the tank accurately discloses the true volume only if the accurate average temperature is known. Such liquids are known to have a predetermined volume at a predetermined temperature. In buying or selling such a liquid, the average temperature is normally taken into consideration and the volume corrected to the volume which would be present at a predetermined standard temperature. Stated otherwise, the purchase price of many such liquids is calculated by determining the temperature of the liquid and the apparent volume at that temperature. The apparent volume is then adjusted to the volume which would be present at a predetermined standard temperature and the purchaser pays for this adjusted volume of fluid.

It has been found that temperatures vary to a considerable extent in tanks. Usually an attempt is made to determine the average temperature as, for example, by lowering a thermometer into a tank a considerable distance, permitting the thermometer to remain at that level until the temperature at this point is indicated on the thermometer and then quickly raising the thermometer and reading the same. As the ambient air temperature is often quite different than that of the liquid and as the surface liquid is in some instances many degrees warmer or colder than the temperature at a lower point, this method is obviously inaccurate. It has likewise been proven that no average temperature is obtainable at one depth and one location in tanks even as small as one thousand barrels. Means such as thermocouples can be positioned in the tanks to take temperatures at various points, but in order to determine the average temperature it is necessary to evenly space the points of indication and to note the various temperatures and average them. This procedure requires considerable time and effort and, accordingly, is not widely followed.

Another difficulty experienced in obtaining true average temperature lies in the fact that unless the temperature indicating devices are evenly spaced, with at least one such indicating device just below the liquid level, a true average cannot be obtained. If thermocouples are located at intervals of perhaps five feet, an improper average would be obtained if the uppermost thermocouple was almost this distance below the surface. This would occur if the thermocouples were fixed in position.

An object of the present invention resides in the provision of a thermocouple cable or cables identical with that illustrated in my previous application for patent, Serial No. 409,239, filed February 9, 1954, for test circuit cables and to provide therefor a means of producing an average temperature indication. This cannot be done merely by connecting the wires from various thermocouple junctions as apparently such an operation merely causes extraneous wild, uncontrolled circuits to be set up and an average reading is not obtained. A feature of the present invention lies in overcoming this previous difficulty.

A feature of the present invention lies in the provision of a thermocouple cable or cables, having thermocouple junctions with a common conductor at spaced points along the length of the cable or cables. Due to the fact that the junctions are successively farther from the point of indication, the resistance of the individual lines connected to the common conductor similarly increases. Means are provided for changing the resistance of the various thermocouple circuits so that a true average reading is provided.

A feature of the present invention resides in the provision of a thermocouple cable having thermocouple junctions between a common conductor and a plurality of conductors of a different material and in adding resistance to the shorter thermocouple circuits so as to compensate for the greater normal resistance of the longer thermocouple circuits. When the various circuits are properly matched, all of the individual conductors which are connected to the common conductors may be connected and an average temperature reading may be obtained which is the true average of the indicated temperatures at the various thermocouple junctions.

An added feature of the present invention resides in the provision of a thermocouple cable including thermocouple junctions which are spaced apart substantially equal distances along the length of a common conductor and in supporting this cable in such a way that the thermocouple junctions are equally spaced regardless of the liquid level in the tank. Means are provided for supporting the cable so that the uppermost thermocouple junction or junctions is at all times supported just below the surface of the liquid and the remaining thermocouple junctions are equally spaced. Obviously the spacing between the thermocouple junctions increases when the depth of liquid increases and this distance decreases when the fluid level decreases. However, at all times the junctions are substantially equally spaced.

These and other objects and novel features of my invention will be more clearly and fully set forth in the following specification and claims.

In the drawings forming a part of the specification:

FIGURE 1 is a diagrammatic view of the thermocouple system showing the general arrangement thereof;

FIGURE 2 is a diagrammatic view showing the thermocouple cable supported within a tank partially filled with liquid;

FIGURE 3 is a view similar to FIGURE 2 showing the thermocouple cable support when the tank is substantially filled with liquid;

FIGURE 4 is a view similar to FIGURES 2 and 3 showing the thermocouple cable suspension when the liquid level in the tank is low;

Figure 5:
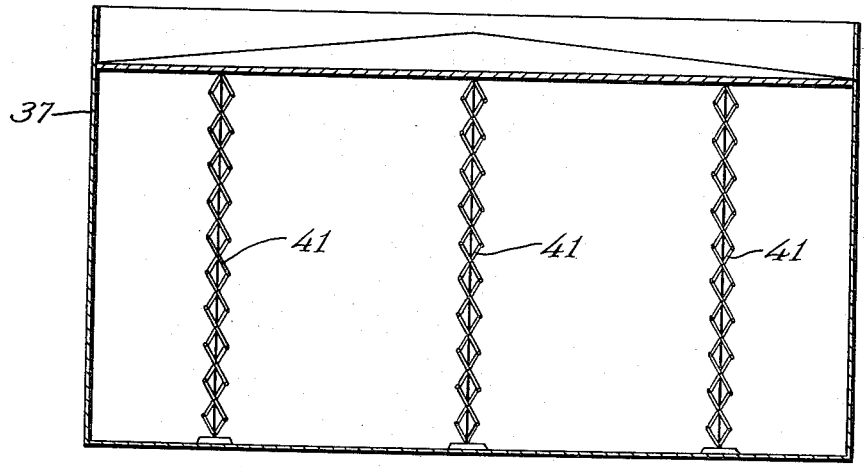
FIGURE 5 is a view similar to FIGURES 2 and 3 showing the use of several thermocouple cables in a partially filled tank.

In general, the thermocouple cable or cables are similar to that shown in my previous application for patent above referred to. The cables include a common conductor 10 having a series of conductors of a different material connected thereto. For example, the common conductor 10 may be formed of constantan while the secondary conductors may be formed of copper. The individual conductors are indicated by the numerals 11, 12, 13, 14, 15, 16, 17, 19, 20, 21, 22 and 23. Twelve such individual conductors are illustrated, although any suitable number of conductors may be employed.

In general, it should be noted that all of the individual conductors described are connected by a common conductor 24 which is connected by a conductor 25 to a selector unit 26. The selector 26 is connected by a conductor 27 to the electronic indicating instrument 29 which serves the function of a galvanometer. The common conductor 10 is also connected by a conductor 30 to the selector unit 26 and through this unit by a conductor 31 to the indicating instrument 29. The selector unit 26 is for connecting a series of similar thermocouple cables to the galvanometer and may be omitted if there is but one thermocouple cable to be read. The common conductor 24 is sufficiently conductive to add but a negligible resistance to the thermocouple circuits. If the conductor is elongated rather than a terminal, the conductor 25 may be connected to a midpoint of conductor 24.

The indicating instrument 29 is of a type capable of producing a temperature indication at any thermocouple junction between any of the individual conductors and the common conductor 10. In other words, if any of the individual conductors were disconnected from the common line 24 and connected directly to conductor 27, an individual temperature indication at a particular thermocouple junction would be provided. In the present system an average indication is desired. In order to produce the average indication, the resistance of each individual thermocouple circuit was determined. For example, the circuit including the common wire 10 and the individual conductor 23 was found to have a resistance of 119.45 ohms. The following table discloses typical resistance figures for the various twelve thermocouple circuits, it being understood that these readings are merely for the purpose of illustration. It is obvious that the resistance of the various circuits depends upon the particular type of wire, the length of wire, the diameter of the wire and other such figures:

| Thermocouple junction | Natural circuit resistance, ohms | Added resistance, ohms | Total resistance, ohms |
|---|---|---|---|
| A | 10 | 671 | 681 |
| B | 20 | 551 | 571 |
| C | 30 | 451 | 481 |
| D | 40 | 361 | 401 |
| E | 50 | 281 | 331 |
| F | 60 | 211 | 271 |
| G | 70 | 151 | 221 |
| H | 80 | 101 | 181 |
| I | 90 | 61 | 151 |
| J | 100 | 31 | 131 |
| K | 110 | 11 | 121 |
| L | 120 | 0 | 120 |

In the above mentioned table the resistance measured is the resistance in each thermocouple circuit between a point such as 31 at the end of the common wire 10 and junction of the individual wire with the conductor 24. Obviously, the resistance of each circuit increases with the length of the circuit and the resistance of the twelfth junction L is 120 ohms which is greater than the resistance of any of the other circuits.

In order to determine the amount of resistance which should be interposed in conductor 22, the difference in natural resistance between the two circuits is computed and a resistance is added in conductor 22 which is slightly greater than the difference so that the resistance in the circuit including the conductor 22 is slightly greater than that including conductor 23. As the natural resistance in one circuit is 120 ohms and the natural resistance in the other is 110 ohms, 11 ohms of resistance is added to conductor 22 so that the total resistance of this circuit is 121 ohms.

In computing the amount of resistance which must be added to conductor 21, 20 ohms is added to compensate for the difference in resistance between the circuit involving the conductor 21 and the circuit including conductor 23. 10 ohms is added as this is the difference in resistance between the circuit including conductor 22. One additional ohm resistance is added so that the resistance is slightly in excess of the required amount. Accordingly, 31 ohms in all is added to conductor 21 making the total resistance of this circuit 131 ohms.

The same procedure is followed in computing the resistance required to be added in the circuit including conductor 20. As the natural difference in resistance between this circuit and the circuit involving conductor 23 is 30 ohms, this sum is added to the difference in resistance of the circuits involving conductors 20 and 22 which amounts to 20 ohms. The difference in resistance of the circuits including conductors 20 and 21 or 10 ohms, is also added together with one additional ohm to provide a slight excess in resistance. Accordingly, 61 ohms resistance is added to conductor 20 and the resistance of this circuit is 151 ohms.

The same procedure is followed to determine the resistance required in conductor 19. The difference in resistance between conductor 19 and all of the previously mentioned conductors 21, 20, 22 and 23, is computed. This amounts to 40 ohms to compensate for conductor 23, 30 ohms to compensate for conductor 22, 20 ohms to compensate for conductor 21, and 10 ohms to compensate for conductor 20, plus an additional ohm to provide the desired excess. As a result 101 ohms are added and the total resistance of this circuit is 181 ohms.

In the same manner the resistance added to each of the circuits 17, 16, 15, 14, 13, 12 and 11 is calculated in each case, and resistance must be added to compensate for all of the previously described circuits. As a result the amount of resistance required in subsequent circuits increases sharply as the uppermost thermocouple circuits are reached.

When the various circuits are balanced in the manner described and the individual conductors are connected together by a common conductor 24, an average temperature reading is provided. In other words, one end of the thermocouple cable can be subject to relatively low temperatures while the other end of the thermocouple cable may be subjected to relatively high temperatures. When all of the temperatures are combined, an average temperature reading is indicated. As a result much of the guess work usually involved in obtaining average temperature readings can be eliminated.

When more extreme ranges of temperature are encountered such as zero degrees to two hundred twelve degrees Fahrenheit, the same basic principle applies. However, it is then practical to likewise extend the range of resistance to compensate for the greater milivolt output of the thermocouples, expansion and contraction of the metals, greater resistance through contra output thermocouple, and combined outputs of thermocouples in concurrence.

The following table discloses for this wider range of temperatures typical resistance figures for the various twelve thermocouple circuits, it likewise being understood that these readings are merely for the purposes of illustration.

| Thermocouple junction | Natural circuit resistance, ohms | Added resistance, ohms | Total resistance, ohms |
|---|---|---|---|
| A | 10 | 920 | 930 |
| B | 20 | 673 | 693 |
| C | 30 | 538 | 568 |
| D | 40 | 422 | 462 |
| E | 50 | 335 | 385 |
| F | 60 | 204 | 264 |
| G | 70 | 130 | 200 |
| H | 80 | 96 | 174 |
| I | 90 | 56 | 146 |
| J | 100 | 26 | 126 |
| K | 110 | 13.5 | 123.5 |
| L | 120 | 0 | 120 |

In order to maintain the thermocouple junctions at equal intervals regardless of the liquid level in a tank, the arrangement illustrated in FIGURES 2, 3, 4 and 5 of the drawings may be employed. These figures illustrate a guide cable 35 extending downwardly from the top 36 of the tank 37, the cable 35 being preferably anchored in some manner at its lower end. A series of lazy tong arms 41 are mounted upon the cable 35, the cable being connected adjacent the center pivots of the lazy tong units. It is characteristic of these members that the center pivots of the lazy tong arms are always equally spaced. Therefore, as the liquid level in the tank increases or decreases, the height of the lazy tong structure varies but the distance between the center pivots remains consistent.

In the structure shown in FIGURES 3 and 4 a float 39 is provided which floats upon the surface of the liquid within the tank 37 and supports the upper end of the lazy tong structure. In the arrangement shown in FIGURE 2, the tank is provided with a vertically movable lid 40 which rises and falls with the liquid level. In this arrangement the upper end of the lazy tong structure 41 is connected beneath the lid 40.

The thermocouple cable is supported with the cable extending along the lazy tong arms and with the thermocouple junctions at the center pivot points of the tong structure. Accordingly, as the distance between the various center pivots of the lazy tong structures 41 remains equal throughout the length of the structure, the spacing between the thermocouple junctions is equal throughout the length of the lazy tong structure.

FIGURE 5 shows the use of multiple thermocouple cable units used in place of the single one described. Where tanks are subjected to changing weather conditions, and where the tanks are of substantial size, such an arrangement is desirable. For example, sun rays directed against one wall of the tank have a tendency to heat the liquid contacting this wall to a substantially higher temperature than the remainder of the liquid. By providing spaced cables, this difficulty may be avoided.

A similar result may be obtained through the use of a spring structure which is constructed to stretch evenly throughout its length. The cable is connected to the spring so that the thermocouple junctions are evenly spaced. As the spring expands and contracts, the distance between adjoining thermocouples varies, but the distance remains equal between all of the thermocouple junctions.

Figure 6:
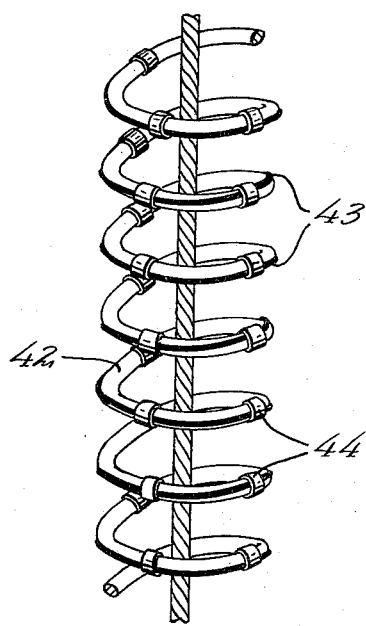
FIGURE 6 is a detail view of a modified form of adjustable cable support which may be used singly or in numbers.

Such a structure is shown in FIGURE 6. An elongated coil spring 42 is connected to the vertically movable tank top or to suitable floats. A weight holds the lower end of the spring at the bottom of the tank. The thermocouple cable 43 is connected to the spring by suitable clips 44, and may either follow the convolutions of the spring 42 or may be looped loosely between convolutions to permit the necessary elongation and contraction of the spring. Clips 45 or other suitable means accomplish this result. The spring may be of the type which elongates equally throughout its length despite the greater weight load on its upper convolutions, thus holding the thermocouples in the cable 43 equally spaced regardless of expansion or contraction of the spring.

It will be seen that by the arrangement described the average temperature of a body of liquid contained within a tank or the like may be easily determined. Tests have shown that the same temperature can be indicated as would be obtained if the temperature at all of the thermocouple junctions was noted and averaged. The system operates effectively in considerable differences of temperature. The usual inaccuracies which have been apparent in most systems of operation are eliminated and considerable time and effort may be saved by providing a direct reading of the average temperature.

In accordance with the patent statutes, I have described the principles of construction and operation of my average temperature indicator, and while I have endeavored to set forth the best embodiment thereof, I desire to have it understood that changes may be made within the scope of the following claims without departing from the spirit of my invention.

I claim:

1. An apparatus for producing an average temperature indication including a thermocouple system including a common wire of one material and a series of wires of another material connected to said common wire at substantially equal intervals to form a plurality of thermocouple junctions, the series of thermocouple wires extending longitudinally of said common wire and varying in length, the total resistance of each set of thermocouple wires and junctions so formed being of predetermined value, a resistance added in each of said thermocouple wires except the longest thermocouple wire connected to the common wire, said added resistance being of such value which is slightly in excess of the total difference of resistances of individual thermocouple wires preceding the one to which the resistance is being added, means for suspending said wires with the junctions substantially vertically spaced throughout a cross-section of the zone to be sensed, a common conductor connected to the ends of all of the thermocouple wires, means supporting said wires when suspended so that said junctions are maintained substantially equidistant apart, and temperature indicating means connected in series between said common conductor and said common wire.

2. The structure of claim 1 and in which the means supporting said wires comprises an expandable and contractable means.

3. The structure of claim 1 and in which the means supporting said wires comprises a lazy tong structure.

4. The structure of claim 3 and in which the thermocouple junctions are supported adjacent to the center pivots of the lazy tong structure.

5. The structure of claim 1 and in which the means supporting said wires comprises a spring.

References Cited in the file of this patent

UNITED STATES PATENTS

| | | |
|---|---|---|
| 705,187 | Zeleny | July 22, 1902 |
| 1,659,804 | Brown | Feb. 21, 1928 |
| 1,985,967 | Wunsch | Jan. 1, 1935 |
| 2,279,043 | Harrington | Apr. 7, 1942 |
| 2,625,043 | Tapp et al. | Jan. 13, 1953 |
| 2,677,276 | Schmidt | May 4, 1954 |
| 2,721,480 | Pierce | Oct. 25, 1955 |
| 2,730,892 | Bruce | Jan. 17, 1956 |